May 23, 1950   G. B. HILL ET AL   2,508,643
VEHICLE MOUNTED LOAD-MOVING MACHINE
Filed Dec. 26, 1947   3 Sheets-Sheet 1
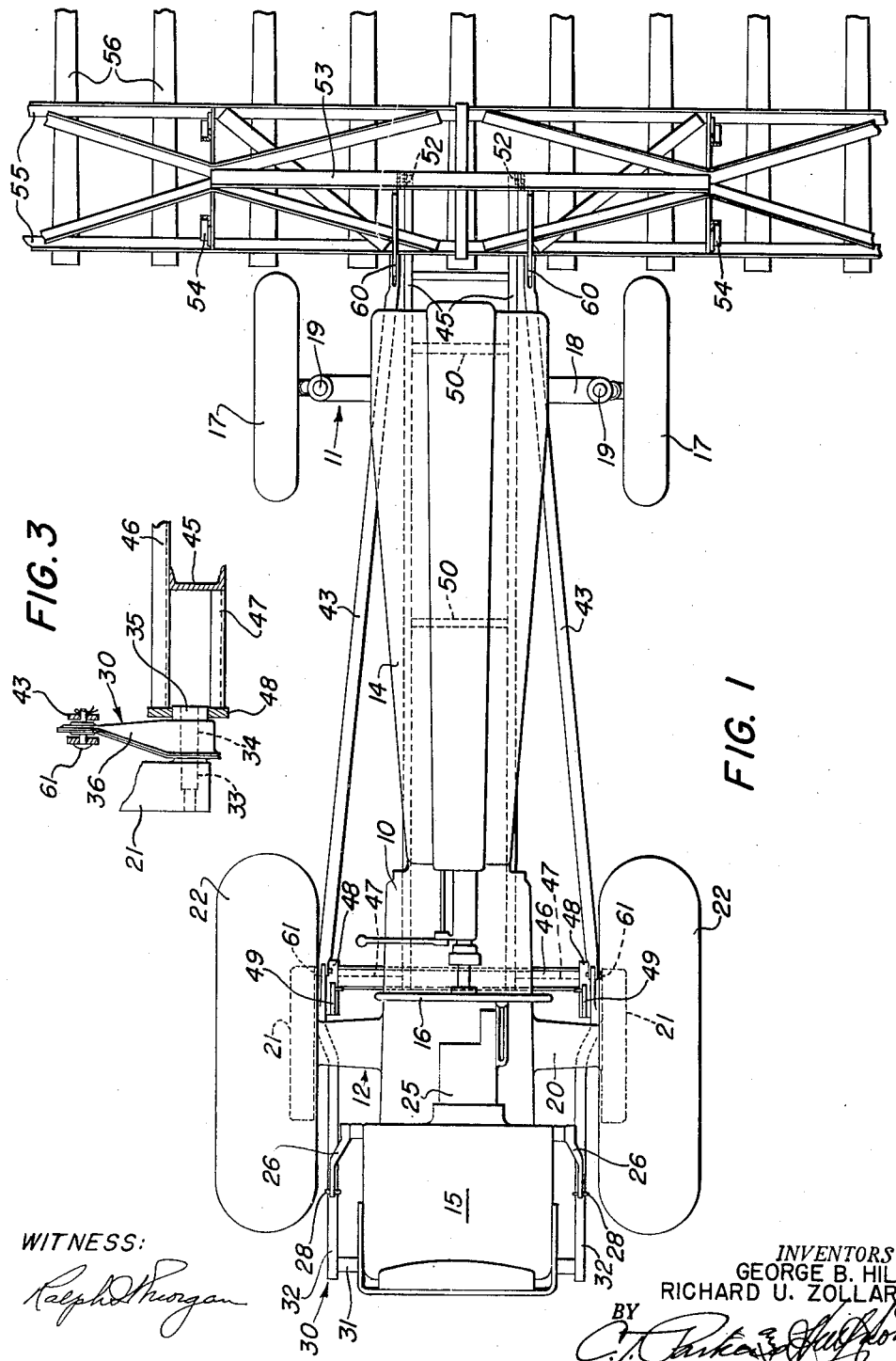
WITNESS:
Ralph S. Morgan
INVENTORS
GEORGE B. HILL
RICHARD U. ZOLLARS
BY
ATTORNEYS

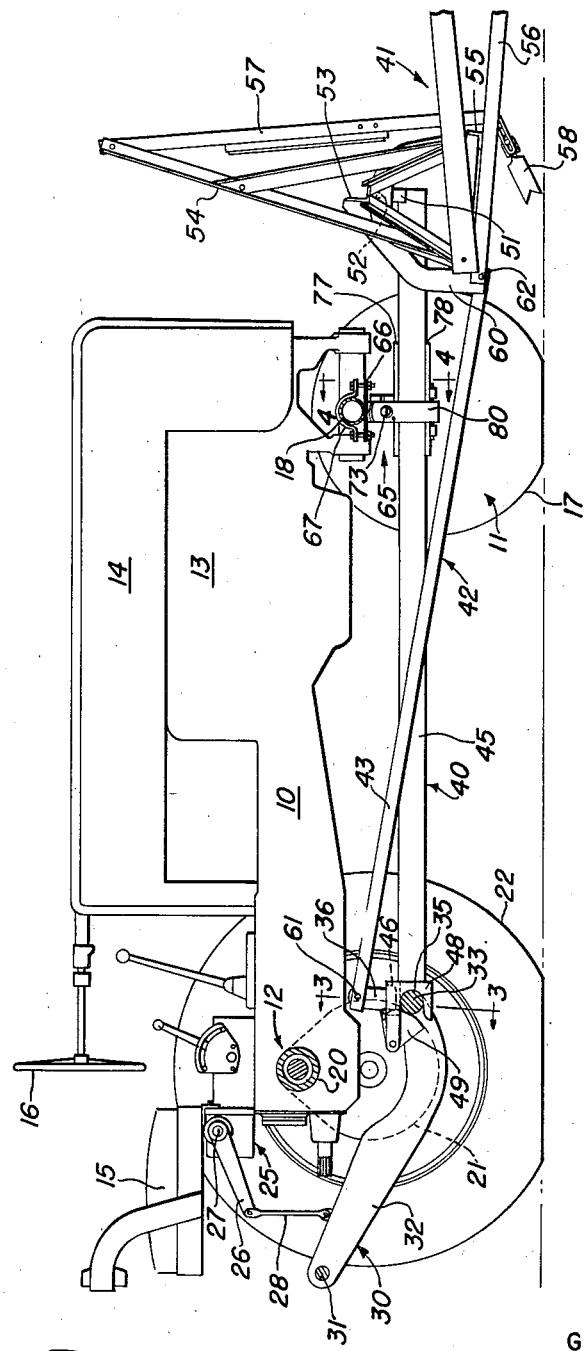

May 23, 1950   G. B. HILL ET AL   2,508,643
VEHICLE MOUNTED LOAD-MOVING MACHINE
Filed Dec. 26, 1947   3 Sheets-Sheet 3

WITNESS:
Ralph W Morgan

INVENTORS
GEORGE B. HILL
RICHARD U. ZOLLARS
BY
ATTORNEYS

Patented May 23, 1950

2,508,643

UNITED STATES PATENT OFFICE 2,508,643

VEHICLE MOUNTED LOAD-MOVING MACHINE

George B. Hill and Richard U. Zollars, Ottumwa, Iowa, assignors to Deere Manufacturing Co., Dubuque, Iowa, a corporation of Iowa Application December 26, 1947, Serial No. 793,928

13 Claims. (Cl. 56—27)

This invention relates to an agricultural implement and more particularly to an implement of the sweep rake type especially adapted for attachment to vehicles, such as tractors or the like. In certain aspects, which will be pointed out more fully below, the invention relates generally to agricultural implements; and in other respects relates to load-moving machines of the sweep rake type.

The invention contemplates and has for its principal object the provision of an improved tractor-mounted sweep rake having a design which renders the rake attachment easily attachable to and detachable from tractors of existing types, and also an attachment which is both structurally and functionally efficient in use and operation. In this respect, the improved rake has many advantages over known rakes in that a simple and effective means is provided for tilting the rake head on its supporting structure; this means is so arranged as to be disposed entirely below the general level of the tractor body, thereby eliminating vertically and horizontally extending superstructure which heretofore complicated the procedure of attaching and detaching the rake, besides constituting interference with the ease of operation of the tractor and further attributing to the general ungainly appearance of the machine.

Another object of the present invention relates to the means for tilting the rake head on its supporting structure, this means preferably comprising a power-operated, vertically swingable drawbar to which is connected control means for the rake head. This phase of the construction is tied in with the general design that keeps the rake structure at a low level with respect to the tractor body. A related object has to do with a simple and effective lever means on the rake head including a portion depending below the tilting axis of the rake head and to which is connected the means that derives power from the power-operated drawbar. Further objects relate to the provision of improved means contributing to the ease with which the rake may be mounted on and dismounted from the tractor.

Other objects inherent in and encompassed by the invention will become apparent to those skilled in the art from a reading of the following detailed description of a preferred embodiment of the invention as shown in the accompanying sheets of drawings, wherein:

Figure 1 is a plan view of tractor and sweep rake attachment;

Figure 2 is a side elevational view of the structure illustrated in Figure 1, with the right hand rear wheel and a portion of the axle structure removed for clarification of the illustration; the right hand front wheel of the tractor is also removed for the same purposes;

Figure 3 is an enlarged transverse sectional view taken substantially on the line 3—3 of Figure 2, and showing the connection of the rear portion of the rake supporting structure to the tractor;

Figure 4:
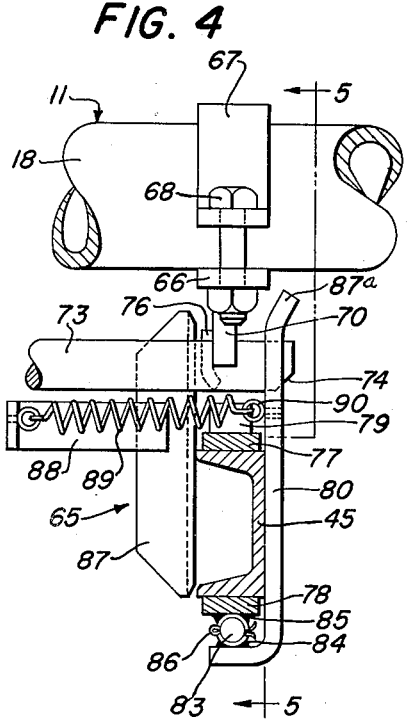
Figure 4 is an enlarged fragmentary transverse sectional view taken substantially on the line 4—4 of Figure 2 and showing part of the supporting means for the forward portion of the rake supporting structure.

The drawings show and reference herein will be had to a particular type of tractor and sweep rake attachment especially designed therefor. However, it is not intended that the particular disclosure should limit the applicability of the invention to machines and implements of allied types; hence, reference herein to a sweep rake attachment should also be taken to include other types of load-moving machines having the same or similar characteristics.

The tractor chosen for the purposes of illustration is of a well known type and has a longitudinal body 10 carried on a front axle structure 11 and a rear axle structure 12. The tractor may be powered by the usual power source, here shown as an internal combustion engine 13 with which is associated the usual hood and grille structure 14 and behind which is located the operator's station including a seat 15 and steering wheel 16 for a pair of transversely spaced steerable front wheels 17 associated with the front axle structure 11.

The front axle structure 11 is of the arched or high clearance type including an upper transverse portion 18 pivoted intermediate its ends on a longitudinal pivot axis to the tractor body 10 and having at each of its outer ends a vertical standard or spindle support 19 at the lower end of which is a spindle on which is journaled a front wheel 17.

The rear portion of the body is, as is conventional, provided as a transmission and differential casing preferably associated as a unit with a transverse axle housing 20 forming part of the rear axle structure 12. The axle housing is provided at each of its opposite ends with a depending final drive housing 21, each of which includes final drive gears and a short axle (not shown) for driving a rear traction wheel 22.

The tractor is equipped with a power lift or power control mechanism, indicated generally by the numeral 25, which, in the present instance, is located below the operator's seat 15, and is associated in the usual manner with drive gearing (not shown) in the rear portion of the body 10. The detailed structure of the power lift mechanism forms no specific part of the present invention and it has therefore been only generally illustrated and described. This mechanism includes at each side thereof a rockable power arm 26 carried on a transverse rockshaft 27 which forms part of the power lift mechanism 25, as is conventional.

The tractor includes a rockable power-transmitting member, which in this case is a drawbar structure 30 and which may be considered part of the rear axle structure 12, inasmuch as the drawbar is carried by the depending housings 21 of the rear axle structure. The drawbar is of generally U-shaped construction and comprises a transverse member 31 and a pair of generally parallel longitudinally extending side arms 32. The side arms are respectively pivoted to the depending housings 21, each pivot preferably comprising a short trunnion 33 disposed transversely and secured to a forward portion of a proximate depending housing 21. The pivots are coaxial on a transverse axis and each includes a bearing 34 (Figure 3) for the drawbar structure 30; and each trunnion 33 further projects inwardly of the side arm 32 to provide a circular mounting element 35, which, as will presently appear, provides means for carrying part of the sweep rake attachment.

The drawbar structure 30 is rocked or moved vertically about the transverse pivot axis through the trunnions 33 by means of the power arms 26 on the power lift mechanism 25. This result is accomplished by means of link connections 28 between the power arms 26 and the side arms 32, respectively, of the drawbar structure, so that rocking movement of the power arms is imparted to the drawbar structure for raising and lowering the latter. Each side arm 32 of the drawbar structure includes at its forward end an integral upstanding portion 36 which provides a lever the upper end of which is movable fore and aft as the drawbar is moved about the axis of the trunnions 33. It is an important feature of the present invention to utilize the drawbar structure, and particularly the lever arms 36, for the purpose of moving or adjusting an implement part, which in the present case is the sweep rake head to be described below.

The sweep rake attachment may be briefly and generally described as comprising supporting structure 40 which extends longitudinally of the tractor below the tractor body and having a rear portion adjacent the drawbar structure 30 and a forward portion projecting ahead of the front end of the tractor to provide means for tiltably supporting a rake head 41. The rake head is tilted on the supporting structure 40 by means of power developed by the rockable drawbar 30, a power-transmitting connection being designated generally at 42 between the lever arm 36 on the drawbar structure and the rake head and being represented in the present case by a pair of longitudinally extending bars 43.

The supporting structure 40 for the rake attachment includes a pusher frame comprising a pair of parallel longitudinally running pusher bars 45 rigidly cross connected at their rear ends by a transverse channel 46 and a parallel angle bar 47. The channel and angle members 46 and 47 project laterally at each side of the pusher frame to provide for the mounting of means by which the pusher frame may be readily and easily attached to and detached from the rear axle structure 12 and the drawbar structure 30. The attaching and detaching means includes a pair of transversely spaced mounting members 48, each of which is bifurcated to receive the circular mounting element 35 on the trunnion 33. A pivoted locking member 49 is associated with each mounting member 48 and is capable of movement from a locking to a releasing position, the former of which is shown in the drawings. The locking member 49 includes an arcuate portion which engages the circular mounting element 35 to provide a wedging action for the purpose of securing the pusher frame to the drawbar structure. The locking members may be swung upwardly to clear the bifurcated portions of the mounting members 48, so that the pusher frame may be moved longitudinally forwardly with respect to the tractor for the purpose of separating the two. The particular type of locking or releasing means forms no part of the present invention and is illustrated here only as representative of one of several types of means that could be employed. The detailed structure of the means illustrated may be found in the U. S. patent to Pearson 1,729,084. The pusher bars are given further rigidity by a pair of cross braces 50 spaced apart longitudinally of the pusher frame.

The extreme forward end of each pusher bar 45 is provided with an upstanding pivot bracket 51, each of which includes a pivot pin 52 for the purpose of pivotally connecting to the pusher frame 45 a transverse angle member 53 forming part of the rake head 41, this angle having rigidly secured thereto a pair of depending ears that receive the pivot pins 52 to provide a transverse tilting axis for the rake head 41. The rake head in many respects may be of conventional construction and is here shown as including vertical supporting structure 54 rigidly secured to the transverse angle 53 and rigidly connected at its lower ends to a pair of transverse angle bars 55. The angle bars are longitudinally spaced apart and have secured thereto a plurality of forwardly extending tines or teeth 56. The upper end of the vertical structure 54 pivotally mounts a depending push-off rack 57 which has at its lower end a ground-engaging sprag 58 by means of which the rack 57 is moved forwardly as the tractor is backed.

The rake head 41 is provided with structure including a pair of rearwardly and downwardly extending lever arms 60 each of which has a lower portion depending to a level considerably below the tilting axis through the pivot pins 52. In this respect it should be noted that the pusher frame comprising the pusher bars 45 is wholly below the level of the tractor body; and the tilting axis through the pins 52 is substantially at the level of the pusher frame. This construction provides for the location of the supporting structure for the rake entirely below the tractor body. The lever arms 36 on the drawbar structure 30 are also below the tractor body, although the upper ends thereof are above the level of the pusher frame. The connecting bars 43 of the means that connects the drawbar and the rake head are pivoted at their rear ends by pivot pins 61 to the lever arms 36 and at their forward ends by pivot pins 62 to the lower ends of the rake head lever arms 60. The bars 23 thus cross the general plane of the pusher frame and operatively connect the drawbar structure and the rake head so that fore and aft movement of the lever arms 36 of the drawbar structure results in tilting of the rake head 41 about its pivot axis through the pins 52.

The arrangement just described is such that the power-transmitting connections of the rake head tilting means are all located at a level below the general level of the tractor body and there is thus eliminated any structure that would ordinarily project vertically upwardly alongside the tractor body. The general design contributes materially to the efficiency of operation of the tractor-mounted sweep rake, and further contributes to the ease with which the attachment may be mounted on or dismounted from the tractor. There are no upstanding lever arms or superstructure to interfere with operation of the unit or form hazards for the operator. The entire unit has a clean cut appearance.

In the same respect it should be noted that the pusher frame passes below the upper portion 18 of the front axle structure 11. The forward portion of the rake-supporting structure including the pusher bars 45 is preferably suspended from the front axle structure by means indicated generally by the numeral 65. This means is of the quick detachable type for the purpose of facilitating attachment of the rake to the tractor and detachment of the same from the tractor and is appropriately coordinated with the quick detachable means 34, 48, 49 at the rear of the pusher frame. Inasmuch as the rake supporting structure is below the tractor body, dismounting of the attachment may be accomplished by releasing the front and rear connecting means, allowing the pusher frame to descend to the ground, and backing the tractor away from the detachment. Reconnection of the attachment to the tractor is accomplished in reverse order, these procedures being facilitated by the connection which locates all attaching parts below the tractor body.

Figure 5:
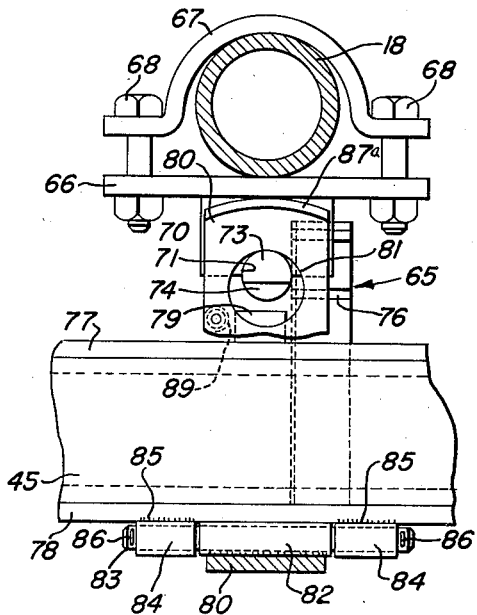
Figure 5 is an end view, partly in section, of the structure shown in Figure 4, as viewed along the line 5—5 of Figure 4.
Figure 7:
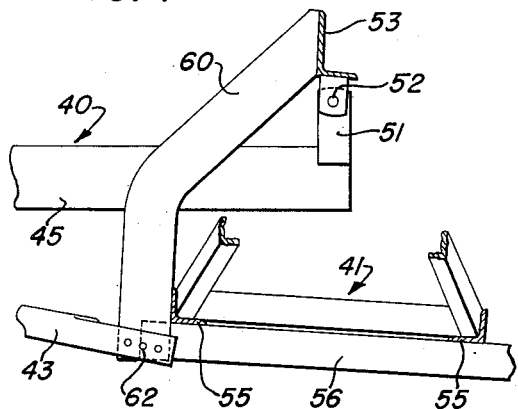
Figure 7 is an enlarged fragmentary view showing a portion of the tilting structure for the rake head.
Figure 6:
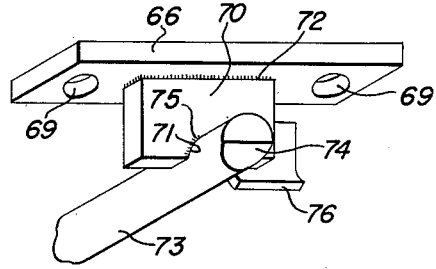
Figure 6 is a fragmentary perspective view of a portion of the front supporting structure.

Since both of the quickly detachable supporting means 65 at the forward portion of the attachment structure are the same, reference will be had to the detailed structure of only one, attention being directed to Figures 4, 5 and 6 of the drawings.

The supporting structure includes a carrier member 66 disposed longitudinally and positioned below an outer end portion of the transverse member 18 of the front axle structure 11. The member 66 is rigidly secured in place on the member 18 by means of a U-shaped strap 67 and a pair of bolt assemblies 68, the member 66 being apertured at 69 (Figure 6) for the purpose of receiving the bolts. Each member 66 includes a depending supporting block 70 provided with a semi-circular notch 71 formed on a transverse axis. The block 70 is rigidly secured to the member 66, as by welding, in the area indicated at 72 in Figure 6. The carrier members 66 and associated blocks 70 are transversely spaced apart on the transverse member 18 of the front axle structure, and the semi-circular notch 71 receives a transverse bar 73 which is preferably circular in cross section. The bar 73 is somewhat longer than the distance between the blocks 70 and each of its opposite ends is chamfered or beveled at 74 for a purpose to presently appear. The bar 73 is rigidly secured, as by welding at 75, to the supporting block 70. The structure just described is of unitary design and may be easily and quickly removed from the transverse portion 18 of the front axle structure 11. Each block 70 has rigidly secured thereto at a portion thereof ahead of the bar 73 a downwardly and outwardly curved guide member 76, the function of which will appear in connection with the description of the attachment of the rake structure to the tractor.

Each pusher bar 45 is provided at a forward portion thereof in the vicinity of the attaching means 65 with an upper and lower strip rigidly secured thereto, the upper strip being designated at 77 and the lower strip at 78. The upper strip 77 includes a spacer block 79 which, when the supporting structure is in place on the front axle structure, is located substantially directly below the outer end portion of the transverse bar 73. The lower strip 78 serves as means for carrying a pivoted hanger 80 by means of which the pusher bar 43 is suspended from the transverse bar 73, the hanger being apertured at 81 at an upper end portion thereof for the purpose of receiving the outer end portion of the bar 73. The hanger is provided at its lower end with an angularly related portion to which is connected a sleeve 82 which in turn carries a longitudinal pivot pin 83. A pair of bearing sleeves 84, one at each side of the sleeve 82, are welded at 85 to the lower strip member 78. The pin 83 is held against longitudinal displacement by means of a pair of cotter pins 86.

Each of the pusher bars 45 has rigidly welded thereto at its inner side an upstanding short angle 87. When the pusher frame is mounted in place on the tractor the angles 87 extend upwardly just ahead of the transverse bar 73 and inwardly of the depending supporting blocks 70 (Figure 4). Each angle 87 has rigidly secured thereto an inwardly extending L-shaped bracket 88 which provides means for anchoring one end of a tension spring 89, the other end of which is connected at 90 to the hanger 80. The spring 89 provides yieldable means for maintaining the hanger 80 in the connecting position shown in Figure 4. The hanger may be swung outwardly about its supporting pin 83 against the tension of the spring 89 for the purpose of freeing the aperture 81 therein from the outer end of the transverse bar 73.

When the rake head is dismounted from the tractor and it is desired to reconnect the same, the pusher frame will be lying on the ground and the tractor will be driven thereover until the connectible portions of the pusher bars are in proximity respectively to the connecting portions on the tractor; that is to say, until the bifurcated mounting members 48 are below and slightly ahead of the circular members or elements 55 on the rear axle structure and the hangers 80 are below the transverse supporting bar 73, it being assumed that the bar 73, together with its associated members 66 and 67, has already been installed on the tractor front axle structure 11, in this connection it being noted that this structure may be used for the purpose of attaching other implements to the tractor. With the tractor and attachment so related, the rear end portions of the pusher bars 45 may be raised and connection made with the rear axle structure in the manner described above. The forward portion of the pusher frame is elevated for the purpose of establishing connection between the hangers 80 and the transverse bar 73. As the pusher frame approaches connecting position the angle members 87 will be guided into proper place by means of the guide members 76. The chamfered or beveled portions 74 at the outer ends of the bar 73 cooperate respectively with the outwardly flared portions 87a on the hangers 80 to deflect the hangers outwardly against tension of the springs 89; the hangers swing back inwardly when the apertures 81 are aligned with the outer ends of the bar 73. In short, the connection at the front end of the pusher frame may be accomplished merely by elevating the pusher frame structure, and connection of the hangers 80 to the bar 73 is automatic. When the supporting structure is in place the angle bars 87 may cooperate with the supporting blocks 70 to prevent lateral displacement of the pusher frame with respect to the tractor. Inasmuch as the apertures 81 in the hangers 80 are considerably larger than the cross sectional area of the transverse bar 73, there will be a limited amount of vertical movement between the pusher bar structure and axle structure 11. In this event the spacer blocks 79 on the upper strips 77 on the pusher bars 45 will contact lower portions of the transverse bar 73 to provide stop means for preventing engagement between the transverse member 18 of the axle and the upper flared portions 87a of the hangers 80, thereby eliminating any likelihood of accidentally disengaging the hangers 80 from the bar 73.

In the operation of the tractor mounted sweep rake, the tines 56 of the rake head are carried in operating position, as shown in Figure 2. When the rake head has acquired a load, the rake head is tilted about the transverse axis through the pivot pins 52, the tilting being accomplished by means of the power-operated drawbar structure 30 operating through the lever arms 36, the longitudinal bars 43 and the lever arms 60 on the rake head 41, all under control of the power control mechanism 25. When the power arms 26 of the power control mechanism 25 are swung upwardly, upward swinging of the drawbar 30 is accomplished through the connecting links between the power arms 26 and the drawbar structure 30, thus raising the rear end of the drawbar structure and moving the upper ends of the lever arms 36 forwardly. Forward movement of the lever arms 36 is transmitted through the longitudinal bars 43 to the lower ends of the lever arms 60 of the rake head 41, thus rocking the lever arms 60 and the rake head in a counter-clockwise direction about the tilting axis and consequently raising the forward ends of the tines 56. The rake head is lowered by operation of the power lift mechanism 25 to permit downward movement of the power arms 26 and consequently downward movement of the drawbar structure 30, with resulting rearward movement of the drawbar lever arms 36, which result may be accomplished by gravity through the weight of the rake head 41 as it returns to operating position.

The foregoing description and illustration are based upon a preferred embodiment of the invention designed according to existing requirements, and the detailed structure of the parts is chosen according to these requirements. It should be understood, therefore, that the disclosure is intended not to limit the invention but to suggest other modifications thereof that will readily occur to those skilled in the art.

We claim:

1. For use with a tractor having a power source and a longitudinal body carried on a transverse front axle structure and on a transverse rear axle structure of the type including transversely spaced depending portions, and a drawbar structure carried on the depending portions on a transverse pivot axis and operatively connected to the tractor power source for vertical swinging about the pivot axis: a sweep rake attachment, comprising a longitudinal pusher frame disposed below the tractor body with its rear end portion adjacent the drawbar structure and its front end portion projecting ahead of and below the front axle structure; means connecting the rear end portion of the pusher frame to the depending portions of the rear axle structure; means supporting a front end portion of the pusher frame from the front axle structure; a rake head at the front of the pusher frame; means connecting the rake head to the pusher frame for tilting about a transverse axis; means providing a lever arm tiltable with the rake head and having a lower end portion depending below the tilting axis; and means including a bar extending generally longitudinally below the level of the tractor body and connected between the drawbar structure and the lower end of the lever arm.

2. For use with a tractor having a longitudinal body carried on a front wheel structure and on a transverse rear axle structure of the type including transversely spaced depending portions, and a drawbar structure carried on the depending portions on a transverse pivot axis for vertical swinging about the pivot axis: a sweep rake attachment, comprising a longitudinal pusher frame disposed below the tractor body with its rear end portion adjacent the drawbar structure and its front end portion projecting ahead of the front wheel structure; means connecting the rear end portion of the pusher frame to the depending portions of the rear axle structure; means supporting a front end portion of the pusher frame on the front wheel structure; a rake head at the front of the pusher frame; means connecting the rake head to the pusher frame for tilting about a transverse axis; means providing a lever arm tiltable with the rake head and having a lower end portion depending below the tilting axis; and means including a bar extending generally longitudinally below the level of the tractor body and connected between the drawbar structure and the lower end of the lever arm.

3. The invention defined in claim 2, further characterized in that: the connection of the pusher frame to the depending portions of the rear axle structure is made on the drawbar pivot axis.

4. For use with a tractor having a longitudinal body carried on a front wheel structure and on a transverse rear axle structure, and a drawbar structure carried on the rear axle structure on a transverse pivot axis for vertical swinging about the pivot axis: a sweep rake attachment, comprising a longitudinal pusher frame disposed below the tractor body with its rear end portion adjacent the drawbar structure and its front end portion projecting ahead of the front wheel structure; means connecting the rear end portion of the pusher frame to the drawbar structure; means supporting a front end portion of the pusher frame on the front wheel structure; a rake head at the front of the pusher frame; means connecting the rake head to the pusher frame for tilting about a transverse axis; means providing a lever arm tiltable with the rake head and having a lower end portion depending below the tilting axis; and means including a bar extending generally longitudinally below the level of the tractor body and connected between the drawbar structure and the lower end of the lever arm.

5. For use with a tractor having a longitudinal body carried on front and rear wheel structures and including a power source and at its rear end having a swinging drawbar swingable by power derived from the power source: a sweep rake attachment, comprising supporting structure for mounting on the tractor and including a portion projecting at one end of the tractor; a rake head; means, including a transverse pivot disposed at a level below the tractor body, mounting the rake head for tilting on said projecting portion of the supporting structure; means on the rake head including a lever movable with the rake head and having a portion depending below the tilting pivot; and means including a longitudinal member disposed below the level of the tractor body and operatively connecting the drawbar and the depending portion of the lever arm.

6. In combination with a tractor having a body structure including a power source and a power-actuated vertically movable drawbar: an implement attachment comprising a carrying frame connected to the tractor; an implement part; means connecting the implement part to the carrying frame for movement from one position to another with respect to the carrying frame; and means operatively connecting the implement part to the drawbar for moving the former by movement of the latter.

7. For use with a tractor having a longitudinal body carried at its front end on a high-clearance front axle structure including a transverse upper portion, and at its rear end on a transverse rear axle, the tractor further having a power source and a power-operated rockable member at its rear end and below the level of the body: a sweep rake attachment, comprising a pair of longitudinally extending pusher bars disposed below the tractor and having their rear end portions generally below the rear axle structure and below the level of the rockable member and their forward end portions passing below the upper portion of the front axle structure and projecting ahead of the tractor; means connecting the rear end portions of the bars to the tractor; means suspending forward portions of the bars from the upper portion of the front axle structure; a rake head ahead of the tractor; means mounting the rake head on the forwardly projecting portions of the pusher bars for tilting about a transverse axis generally at the level of the pusher bars; means including a lever arm connected to the rake head and having a portion depending below the tilting axis; and means including a generally longitudinally extending member connected at a rear end portion to the rockable element at a point above the level of the pusher bars and connected at its forward end to the depending portion of the lever arm.

8. For use with a tractor having a longitudinal body carried at its front end on a front axle structure and at its rear end on a transverse rear axle, the tractor further having a power source and a power-operated rockable member at its rear end and below the level of the body: a sweep rake attachment, comprising a pair of longitudinally extending pusher bars disposed below the tractor and having their rear end portions generally below the rear axle structure and below the level of the rockable member and their forward end portions projecting ahead of the tractor; means connecting the rear end portions of the bars to the tractor; means connecting the forward portions of the bars to the tractor; a rake head ahead of the tractor; means mounting the rake head on the forwardly projecting portions of the pusher bars for tilting about a transverse axis generally at the level of the pusher bars; means including a lever arm connected to the rake head and having a portion depending below the tilting axis; and means including a generally longitudinally extending member connected at a rear end portion to the rockable element at a point above the level of the pusher bars and connected at its forward end to the depending portion of the lever arm.

9. For use with a tractor of the type having a power-operated vertically swingable drawbar: a sweep rake attachment, comprising supporting structure connectible to the tractor; a rake head tiltably carried by the supporting structure; and means operatively connecting the rake head to the drawbar for tilting the former upon swinging of the latter.

10. For use with frame structure having a generally horizontal frame part: an implement part; supporting means including a generally horizontal carrying member; means for detachably connecting the supporting means to the frame structure for disposition of the carrying member in spaced relation below said frame part; and means for detachably connecting the implement to and below the carrying member, including an implement-suspending element apertured to receive and engage the carrying member; means connecting said element to the implement for swinging of the element with respect to the implement between one position, wherein the apertured element receives and engages the carrying member, and a second position, wherein the element is disengaged from said member, yielding means normally effective to maintain the element in engaging position, and means cooperable between the supporting means and the implement part to limit relative horizontal displacement of said supporting means and implement.

11. In a tractor and mounted load-moving machine of the class wherein the tractor has a longitudinal body and an arched front axle of the type having a transverse upper portion, and wherein the load-moving machine has supporting structure connected to the tractor including a longitudinal bar extending under the transverse portion of the arched axle, the improvement comprising: a support including a transverse carrying member; means for detachably securing the support to the transverse axle portion with the carrying member generally paralleling and below said portion; a hanger having an aperture therein; means mounting the hanger on the bar for movement with respect to the bar and carrying member from one position in which the aperture receives the carrying member to suspend the bar from the carrying member to a position in which the hanger is free of the carrying member; and means normally effective to maintain the hanger in its first mentioned position.

12. The invention defined in claim 11, further characterized in that: means are cooperable between the support and the bar for limiting relative transverse displacement of the two.

13. In a tractor and connected implement of the class wherein the tractor has a longitudinal body and a front axle having a transverse portion, and wherein the implement has supporting structure connected to the tractor including a bar extending longitudinally with respect to the transverse portion of the axle, the improvement comprising: a support including a transverse carrying member; means for detachably securing the support to the transverse axle portion with the carrying member generally paralleling said portion; a hanger having an aperture therein; means mounting the hanger on the bar for movement with respect to the bar and carrying member from one position in which the aperture receives the carrying member to support the bar from the carrying member to a position in which the hanger is free of the carrying member; and means normally effective to maintain the hanger in its first mentioned position.

GEORGE B. HILL.
RICHARD U. ZOLLARS.

REFERENCES CITED

The following references are of record in the file of this patent:

UNITED STATES PATENTS

| Number | Name | Date |
| --- | --- | --- |
| 1,464,740 | Benjamin et al. | Aug. 14, 1923 |
| 1,521,060 | Weigel | Dec. 30, 1924 |
| 1,729,084 | Pearson | Sept. 24, 1929 |
| 1,742,494 | Clausen | Jan. 7, 1930 |
| 1,855,838 | Kranick | Apr. 26, 1932 |
| 1,887,352 | Huddle | Nov. 8, 1932 |
| 2,218,579 | Jones et al. | Oct. 22, 1940 |
| 2,322,295 | Hill | June 22, 1943 |
| 2,388,411 | Hicks | Nov. 6, 1945 |

FOREIGN PATENTS

| Number | Country | Date |
| --- | --- | --- |
| 278,441 | Great Britain | Oct. 10, 1927 |